(12) United States Patent
Yoon et al.

(10) Patent No.: US 11,669,720 B2
(45) Date of Patent: Jun. 6, 2023

(54) STORAGE DEVICE AND METHOD OF OPERATING THE SAME

(71) Applicant: SAMSUNG ELECTRONICS CO., LTD., Suwon-si (KR)

(72) Inventors: Sungroh Yoon, Seoul (KR); Hyeokjun Choe, Seoul (KR); Seongsik Park, Seoul (KR); Seijoon Kim, Seongnam-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 225 days.

(21) Appl. No.: 17/230,331

(22) Filed: Apr. 14, 2021

(65) Prior Publication Data

US 2022/0083847 A1 Mar. 17, 2022

(30) Foreign Application Priority Data

Sep. 11, 2020 (KR) .................. 10-2020-0117046

(51) Int. Cl.
*G06N 3/063* (2023.01)
*G06F 9/50* (2006.01)
*G06F 12/10* (2016.01)

(52) U.S. Cl.
CPC .......... *G06N 3/063* (2013.01); *G06F 9/5016* (2013.01); *G06F 9/5061* (2013.01); *G06F 12/10* (2013.01)

(58) Field of Classification Search
CPC ..... G06N 3/063; G06F 9/5016; G06F 9/5061; G06F 12/10
See application file for complete search history.

(56) References Cited

U.S. PATENT DOCUMENTS

| | | | |
|---|---|---|---|
| 6,205,536 B1 | 3/2001 | Yoshida | |
| 9,606,916 B2 | 3/2017 | Lee et al. | |
| 10,503,655 B2 | 12/2019 | Meswani et al. | |
| 10,956,584 B1 * | 3/2021 | Heaton | G06N 3/045 |
| 11,481,215 B2 * | 10/2022 | Chen | G06N 7/01 |
| 11,544,547 B2 * | 1/2023 | Kulkarni | G06F 7/523 |
| 2018/0053086 A1 | 2/2018 | Liu et al. | |
| 2019/0187898 A1 | 6/2019 | Gu et al. | |
| 2020/0004652 A1 | 1/2020 | Niu et al. | |
| 2020/0042240 A1 | 2/2020 | Therene et al. | |
| 2021/0326685 A1 * | 10/2021 | Lee | G06F 11/1476 |
| 2022/0027083 A1 * | 1/2022 | Zuolo | G11C 11/54 |

* cited by examiner

*Primary Examiner* — Zachary K Huson
(74) *Attorney, Agent, or Firm* — Sughrue Mion, PLLC

(57) ABSTRACT

A method of operating a storage device including a neural network processor includes outputting, by a controller device, a trigger signal instructing the neural network processor to perform a neural network operation in response to a command from a host device, requesting, by a neural network processor, target model data about parameters of a target model and instruction data for instructing the neural network operation to a memory device storing the target model data and the instruction data in response to the trigger signal, receiving, by the neural network processor, the target model data and the instruction data from the memory device and outputting, by the neural network processor, inference data based on the target model data and the instruction data.

20 Claims, 9 Drawing Sheets

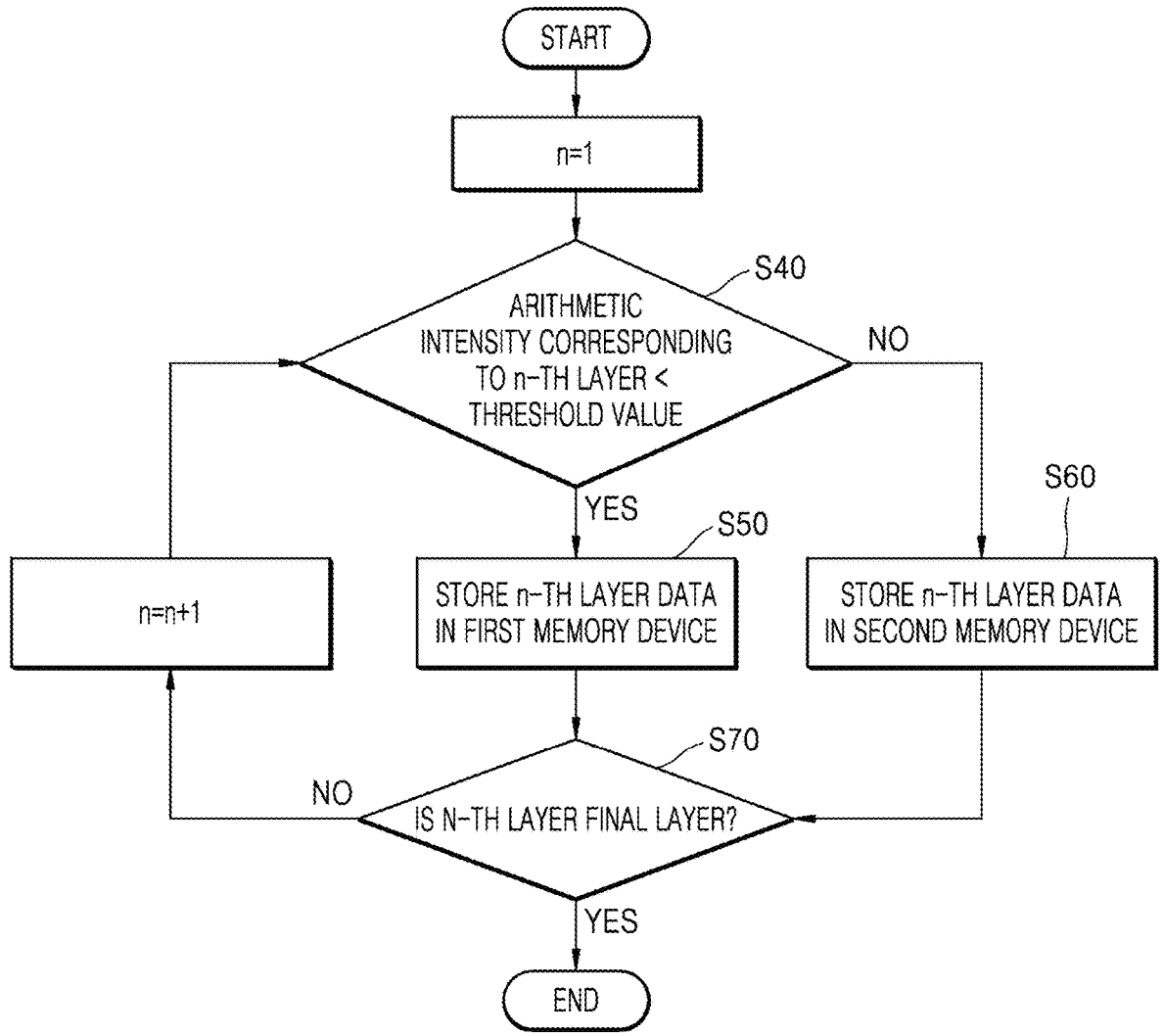

STORAGE DEVICE AND METHOD OF OPERATING THE SAME

CROSS-REFERENCE TO RELATED APPLICATION

This application is based on and claims priority from Korean Patent Application No. 10-2020-0117046, filed on Sep. 11, 2020, in the Korean Intellectual Property Office, the disclosure of which is incorporated herein in its entirety by reference.

BACKGROUND

The inventive concept relates to a storage device, and more particularly, to a storage device including a neural network processor and a method of operating the storage device.

A storage device configured to perform a neural network operation based on a deep learning model requires a lot of operations for learning and inference. When it is difficult for a mobile device to provide computing power required for deep learning, the mobile device may transmit data to a cloud server, which may perform operations for deep learning, and the mobile device may receive a result of the operations and provide deep learning inference data to a user. However, in this process, there are problems that may arise, such as, costs for using a cloud service are continuously incurred, and inference data cannot be received from the cloud server offline.

Accordingly, a neural processing unit (NPU) specialized for the neural network operation is embedded in the mobile device, and thus, the mobile device itself may perform the neural network operation.

SUMMARY

The inventive concept provides a storage device, which efficiently performs a neural network operation by improving the commands between a controller and a neural network processor of the storage device. For instance, according to an aspect of the inventive concept, a neural network operation may be performed by eliminating unnecessary commands between a controller and a neural network processor of the storage device.

According to an aspect of the disclosure, there is provided a method of operating a storage device comprising a neural network processor, the method included: outputting, by a controller device, a signal instructing the neural network processor to perform a neural network operation based on a command from a host device; requesting, by the neural network processor, target model data and instruction data from a memory device storing the target model data and the instruction data based on the signal, the target model data corresponding to parameters of a target model and the instruction data for performing the neural network operation based on the target model; receiving, by the neural network processor, the target model data and the instruction data from the memory device; and outputting, by the neural network processor, inference data based on the target model data and the instruction data.

According to another aspect of the disclosure, there is provided a storage device including: a controller device configured to output a first signal instructing a neural network operation based on a command from a host device; a memory device configured to store target model data corresponding to a parameter of a target model in a first page area of a page in the memory device and store instruction data for instructing the neural network operation in a second page area of the page in the memory device; and a neural network processor configured to: output a second signal to the memory device based on the first signal, the second signal including a request for the target model data and the instruction data from the memory device, receive the target model data and the instruction data from the memory device, and output inference data based on the target model data and the instruction data.

According to another aspect of the disclosure, there is provided a memory device including: a memory cell array comprising a plurality of pages; and a memory controller device configured to: perform a read operation on a target page, among the plurality of pages, based on a read command for the target page, and output the target page, wherein each of the plurality of pages comprises: a first page area configured to store target model data corresponding to a target model on which a neural network operation is to be performed; and a second page area configured to store instruction data for instructing the neural network operation on the target model.

According to another aspect of the disclosure, there is provided a method performed by a neural network processor, the method comprising: receiving a command to perform a neural network; requesting, based on the command, target model data and instruction data from a memory device storing the target model data and the instruction data, the target model data corresponding to parameters of a target model and the instruction data for performing a neural network operation based on the target model; receiving the target model data and the instruction data from the memory device; generating inference data based on the target model data and the instruction data; and outputting the inference data.

According to another aspect of the disclosure, there is provided a storage device including: a memory storing one or more instructions; and a processor configured to execute the one or more instructions to: receive a command to perform a neural network; output a request, based on the command, for target model data and instruction data from a memory device storing the target model data and the instruction data, the target model data corresponding to parameters of a target model and the instruction data for performing a neural network operation based on the target model; receive the target model data and the instruction data from the memory device; generate inference data based on the target model data and the instruction data; and output the inference data.

BRIEF DESCRIPTION OF THE DRAWINGS

Embodiments of the inventive concept will be more clearly understood from the following detailed description taken in conjunction with the accompanying drawings in which:

FIG. 10 is a flowchart of an example of determining a memory device in which layer data is to be stored, according to an arithmetic intensity of each layer;

FIG. 11 is a diagram showing a table in which a storage position determined for each layer is mapped, according to an example embodiment of FIG. 10.

DETAILED DESCRIPTION OF THE EMBODIMENTS

Embodiments will now be described more fully with reference to the accompanying drawings.

Figure 1:
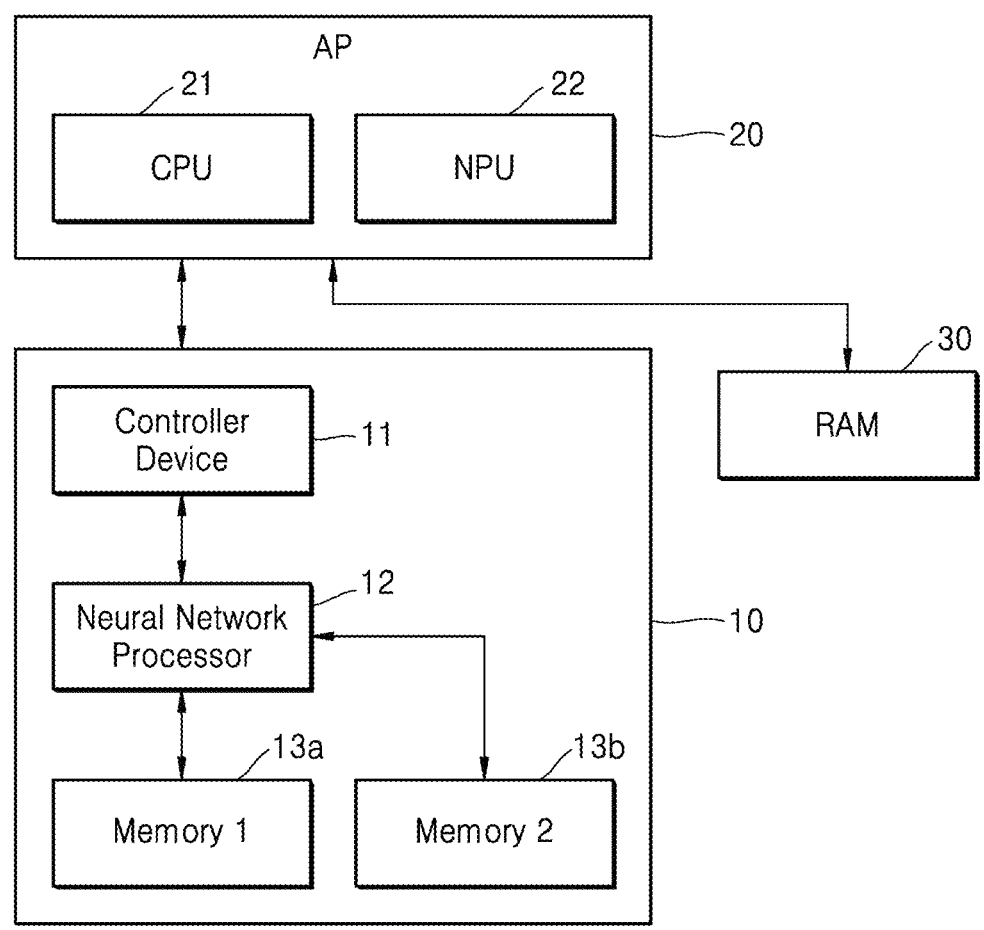
FIG. 1 is a schematic block diagram of a neural network system according to an example embodiment.

FIG. 1 is a schematic block diagram of a neural network system according to an example embodiment.

The neural network system may train a neural network. According to an example embodiment, the neural network system may analyze input data by using the neural network and infer information included in the input data. For instance, the neural network system may learn using the neural network and training data. The neural network system may determine a situation or control components of an electronic device in which the neural network system is mounted, based on the inferred information. For example, the neural network system may be applied to smartphones, tablet devices, smart televisions (TVs), augmented reality (AR) devices, Internet of Things (IoT) devices, autonomous vehicles, robots, medical devices, drones, advanced drivers assistance systems (ADAS), image display devices, and measuring devices, which perform a voice recognition operation, an image recognition operation, an image classification operation, and an image processing operation using the neural network. In addition, the neural network system may be mounted in one of various types of electronic devices.

Referring to FIG. 1, the neural network system may include a storage device 10, an application processor (AP) 20, and random access memory (RAM) 30. The neural network system may further include an input/output (I/O) module, a security module, and a power control device and further include various kinds of processors. In some example embodiments, some or all of components of the neural network system may be formed on a single semiconductor chip. For example, the neural network system may be implemented as a System-on-Chip (SoC). However, the disclosure is not limited thereto, and as such, according to another example embodiment, the neural network system may be formed on a plurality semiconductor chips.

The AP 20 may include a central processing unit (CPU) 21 and a neural processing unit (NPU) 22. The CPU 21 may control all operations of the AP 20. The CPU 21 may include a single core or a plurality of processor cores (or a multi-core). The CPU 21 may process or execute programs and/or data stored in a storage region (e.g., the storage device 10), by using the RAM 30. The NPU 22 of the AP 20 may update a weight parameter of a neural network model by training the neural network model, and generate inference data based on input data received from an external device. For example, the CPU 21 may execute an application program and control the NPU 22 to perform required tasks based on the neural network according to the execution of the application program.

The storage device 10 may receive a command from a host device and provide data required by the host device to the host device based on the command. The storage device 10 may include a controller device 11, a neural network processor 12, and a plurality of memory devices (e.g., first and second memory devices 13a and 13b). The controller device 11 may receive the command from the host device outside the storage device 10, analyze the command, and transmit a control signal and an address signal to the neural network processor 12 or the plurality of memory devices.

The neural network processor 12 may perform a neural network operation based on received input data. Furthermore, the neural network processor 12 may generate an information signal based on a result of the neural network operation. The neural network processor 12 may be implemented as a neural network operation accelerator, a coprocessor, a digital signal processor (DSP), or an application specific integrated circuit (ASIC) and perform operations of at least one of various types of neural network models, such as a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, and a fully convolutional network.

The plurality of memory devices may include at least one of a volatile memory and a non-volatile memory. The non-volatile memory may include read-only memory (ROM), programmable ROM (PROM), electrically programmable ROM (EPROM), electrically erasable and programmable ROM (EEPROM), and/or flash memory. The volatile memory may include dynamic RAM (DRAM), static RAM (SRAM), and/or synchronous DRAM (SDRAM). According to an example embodiment, the plurality of memory devices may include at least one of a hard disk drive (HDD), a solid-state drive (SSD), a compact flash (CF) card, a secure digital (SD) card, a micro-SD card, a mini-SD card, an extreme digital (xD) card, and a memory stick.

The plurality of memory devices may include the first memory device 13a and the second memory device 13b. The first memory device 13a and the second memory device 13b may be different types of memory devices and may be memory devices classified according to a data processing rate or a data transmission rate. For example, the first memory device 13a may be a high-bandwidth NAND (HBN) memory, and the second memory device 13b may be a NAND memory. Although the example embodiment of FIG. 1 illustrates only two types of memory devices as the plurality of memory devices, the inventive concept of the disclosure is not limited thereto, and as such, according to other example embodiment, the plurality of memory devices may include two or more of memory devices and may include two or more types of memory devices. According to yet another example embodiment, the storage device 10 may include one memory device.

The plurality of memory devices may include a plurality of memory blocks, each of which includes a plurality of pages. The neural network processor 12 may designate a page to be read, from a memory device, and transmit an address of the designated page to the memory device, and thus, the memory device may transmit data about the designated page to the neural network processor 12. The plurality of memory devices may store target model data in a first page area of each page and store instruction data in a second page area of each page.

The target model data may be data about parameters of a target model on which a neural network operation is to be performed, and the instruction data may be data for instructing the neural network operation. A process of performing a series of neural network operations by reading data from the memory device in which the target model data is stored in the first page area and the instruction data is stored in the second page area will be described below with reference to FIG. 4.

Figure 2:
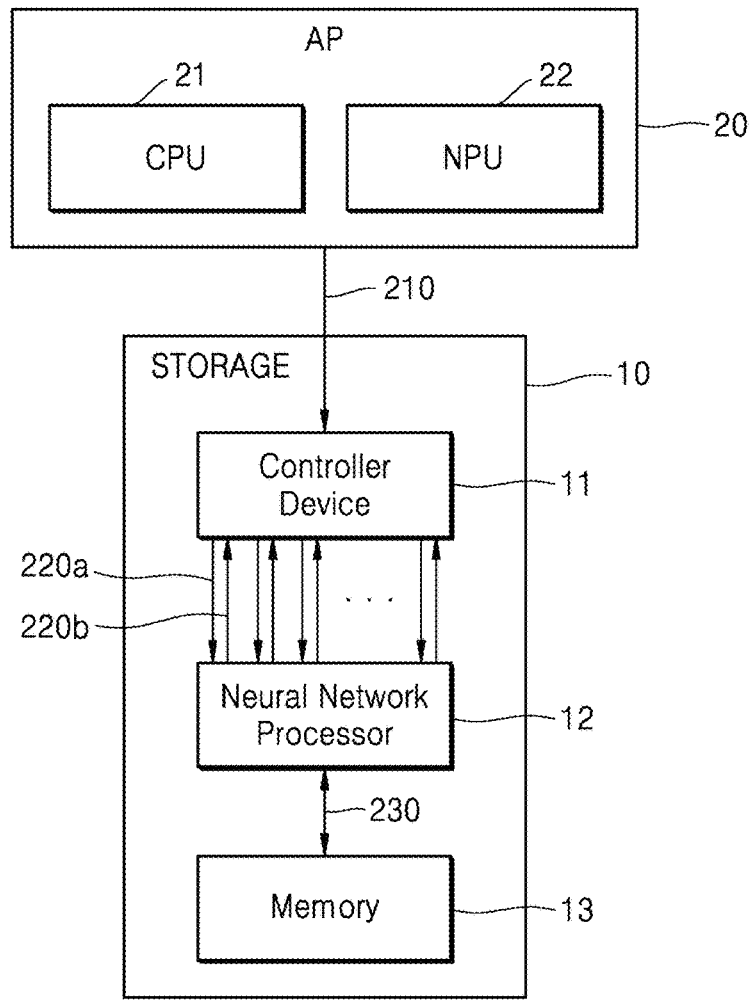
FIG. 2 is a block diagram showing components of a storage device and an application processor (AP) and control signals between the storage device and the AP, according to a comparative embodiment.

FIG. 2 is a block diagram showing control signals between a storage device 10 and an AP 20 and configurations of the storage device 10 and the AP 20, according to a comparative neural network system.

Referring to FIG. 2, the AP 20 may transmit a command 210 to the storage device 10 along input data for performing a neural network operation. The command 210 may be a command signal for instructing the neural network operation. According to another example embodiment, command 210 may be a signal for designating a target neural network model for performing an operation along with the command signal for instructing the neural network operation. The input data may be data for generating an inference result by performing the neural network operation. For example, the input data may be image data for generating an inference result of a target object. In addition, according to the comparative embodiment, the AP 20 may transmit instruction data to the storage device 10 to perform the neural network operation on a target model. The controller device 11 of the storage device 10, which has received the instruction data, may decode the instruction data and generate an instruction signal 220a.

The controller device 11 of the storage device 10 may receive the command 210 and transmit the instruction signal 220a to the neural network processor 12 for instructing the neural network processor 12 to perform the neural network operation on the input data. According to the comparative neural network system, the instruction signal 220a may include a trigger signal for instructing the neural network processor 12 to perform the neural network operation on the target model and a signal for decoding the instruction data and instructing a series of operations on each of a plurality of layers.

For example, the controller device 11 may instruct the neural network processor 12 to perform the neural network operation on the target model, and the neural network processor 12 may receive the instruction signal 220a and start to perform the neural network operation on a first layer. In this case, the neural network processor 12 may perform a series of operations to output result data about the first layer. To perform each of the operations, the neural network processor 12 may have to sequentially receive instruction signals 220a from the controller device 11. The neural network processor 12 may perform a first operation on the first layer and notify the controller device 11 that the first operation has been completed. The controller device 11 may be notified that the first operation has been completed, and may instruct the neural network processor 12 to perform a second operation. That is, when m operations are to be performed on n layers to generate an inference result (where m and n are integers), the controller device 11 according to the comparative neural network system may have to transmit and receive a total of 2*n*m instruction signals 220a and a total of 2*n*m completion signals 220b.

A memory device 13 according to the comparative neural network system may store only target model data and provide the target model data to the neural network processor 12 in response to a model data request signal 230 of the neural network processor 12 without transmitting instruction data to the neural network processor 12. That is, the memory device 13 does not provide the instruction data to the neural network processor 12 according to the comparative neural network system illustrated in FIG. 2.

In contrast, the storage device 10 according to the inventive concept may store target model data and instruction data together in a memory (e.g., memory device 13a or memory device 13b), receive the target model data together with the instruction data, and perform a series of operations without transmitting and receiving the instruction signal 220a and the completion signal 220b to and from the controller device 11.

Figure 3:
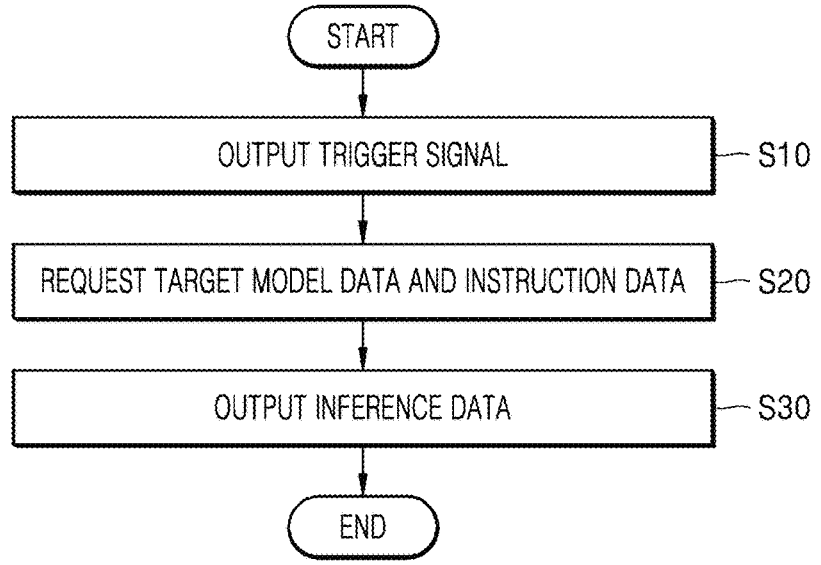
FIG. 3 is a flowchart of a method of operating a storage device, according to an example embodiment.

FIG. 3 is a flowchart of a method of operating the storage device 10 of FIG. 1, according to an example embodiment. FIG. 3 will be described with reference to FIG. 1.

The neural network processor 12 of the storage device 10 according to the example embodiment may receive a signal from the controller device 11, receive target model data and instruction data together from a memory device based on the trigger signal, output inference data. According to an example embodiment, the neural network processor 12 of the storage device 10 may receive a trigger signal from the controller device 11. According to an example embodiment, the neural network processor 12 may receive the target model data and the instruction data from the first memory device 13a or the second memory device 13b.

In operation S10, the controller device 11 of the storage device 10 may output a signal to the neural network processor 12 in response to a command received from a host device. The signal may be a trigger signal for instructing the neural network processor 12 to perform a neural network operation. In addition, the controller device 11 may transmit both the signal for instructing the neural network operation and a signal for designating a model on which the neural network operation is to be performed, from among a plurality of neural network models.

In operation S20, the neural network processor 12 of the storage device 10 may receive a command from the controller device 11 and request the target model data and the instruction data from the memory device. According to an example embodiment, the neural network processor 12 may request the target model data and the instruction data from the first memory device 13a or the second memory device 13b. The neural network processor 12 according to an example embodiment may determine a type of input data or an amount of calculations of the input data and select a target model to perform an operation, from among a plurality of neural network models. However, the neural network processor 12 is not limited thereto, and as such, according to another example embodiment, the neural network processor 12 may receive a signal indicating the target model to perform the operation, from the trigger signal, and select the target model to perform the operation.

The neural network processor 12 may receive a page address in which an internal buffer memory or a target memory stored in an internal controller is stored, and receive target model data and instruction data stored in the received page address from the memory device. According to an example embodiment, the neural network processor 12 may receive the target model data and the instruction data stored in the received page address from the first memory device 13*a* or the second memory device 13*b*.

In operation S30, the neural network processor 12 may output inference data about the input data based on the target model data and the instruction data. The target model data may include a plurality of pieces of layer data. The neural network processor 12 may output result data corresponding to each layer based on layer data about the layer. The result data of a current layer may be input into the next layer, and thus, inference data may be generated from the output result data of a final layer.

To generate the result data about each layer, the neural network processor 12 may perform a plurality of operations. Each of the operations may be performed based on the instruction data. As an example, to generate the result data about each layer, the neural network processor 12 may perform a multiplication operation on the input data and a weight parameter. In this case, a controller of the neural network processor 12 may operate a processing circuit to output a result of the multiplication operation on the input data and the weight parameter, based on the instruction data received from the memory device.

Figure 4:
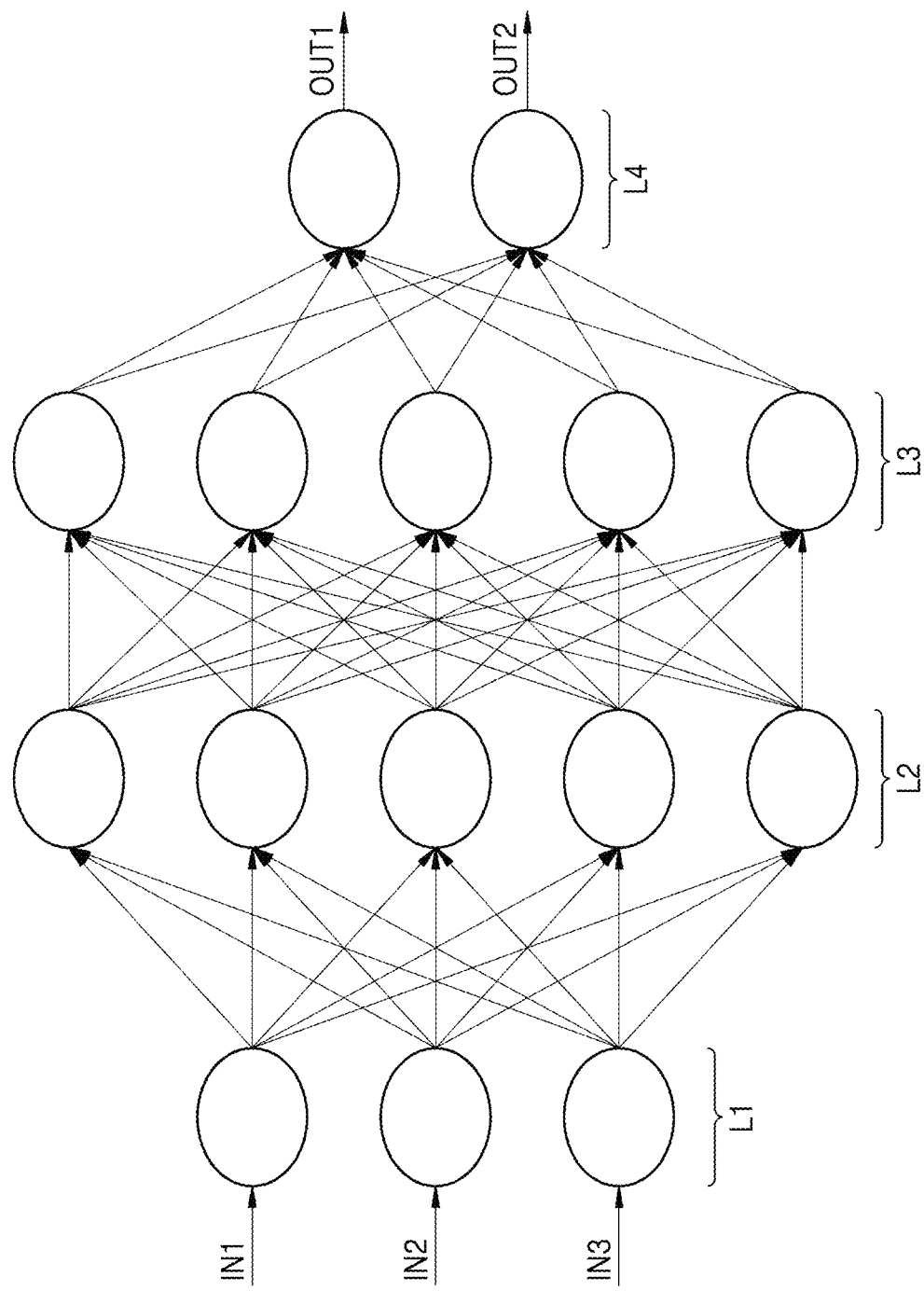
FIG. 4 is a diagram of neural network layers according to an example embodiment.

FIG. 4 is a diagram of neural network layers according to an example embodiment. FIG. 4 will be described with reference to FIG. 1.

A neural network model according to an example embodiment may include a plurality of layers (e.g., first to fourth layers L1, L2, L3, and L4). A neural network processor 12 may output result data about each of the first to fourth layers L1, L2, L3, and L4, receive result data about a previous layer, and generate inference data pieces OUT1 and OUT2 from a final layer. Referring to FIG. 4, the neural network model may include four layers, for example, the first to fourth layers L1, L2, L3, and L4. The first layer L1 may be an input layer, the second layer L2 and the third layer L3 may be hidden layers, and the fourth layer L4 may be an output layer. Although four layers L1, L2, L3, and L4 are illustrated according to an example embodiment in FIG. 4, the disclosure is not limited thereto, and as such, according to another example embodiment different number of layers may be provided.

According to an example embodiment illustrated in FIG. 4, the neural network processor 12 may provide input data IN1, IN2, and IN3 to the first layer L1 and receive output result data from the first layer L1. Thereafter, the neural network processor 12 may provide the output result data from the first layer L1 as input data to the second layer L2, and receive output result data from the second layer L2. Thereafter, the neural network processor 12 may provide the output result data from the second layer L2 as input data to the third layer L3, and receive output result data from the third layer L3. Finally, the neural network processor 12 may provide the output result data from the third layer L3 as input data to the fourth layer L4, which is a final layer, and receive output result data from the fourth layer L4. The neural network processor 12 generate inference data pieces OUT1 and OUT2 from the output result data from the fourth layer.

A storage device 10 may store data related to a trained neural network model as model data and store weight parameters, which are updated by training for each layer, as layer data. That is, the model data may include a plurality of pieces of layer data and structure data about the plurality of layers included in the neural network model.

Figure 5:
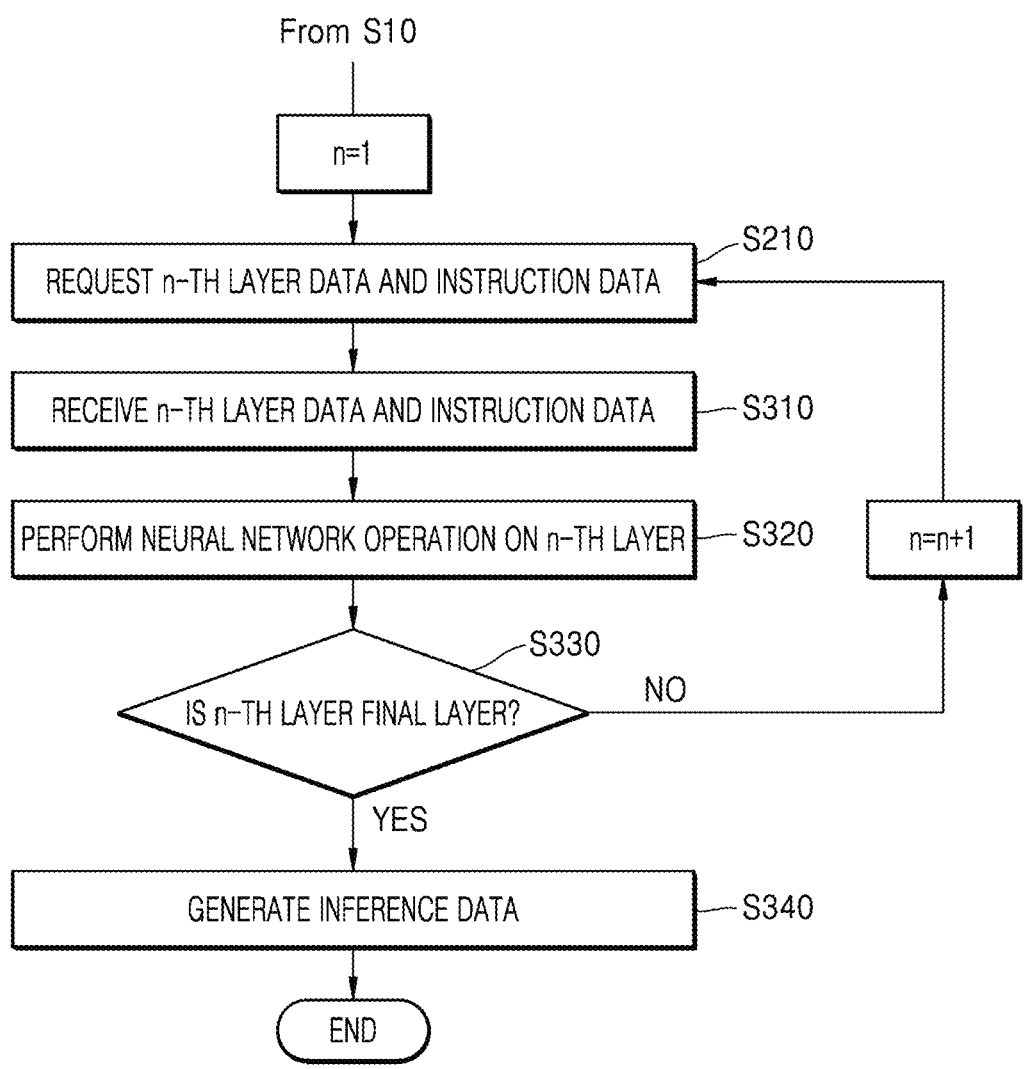
FIG. 5 is a flowchart of a method of generating inference data by performing a neural network operation on a plurality of layers, according to an example embodiment.
Figure 6:
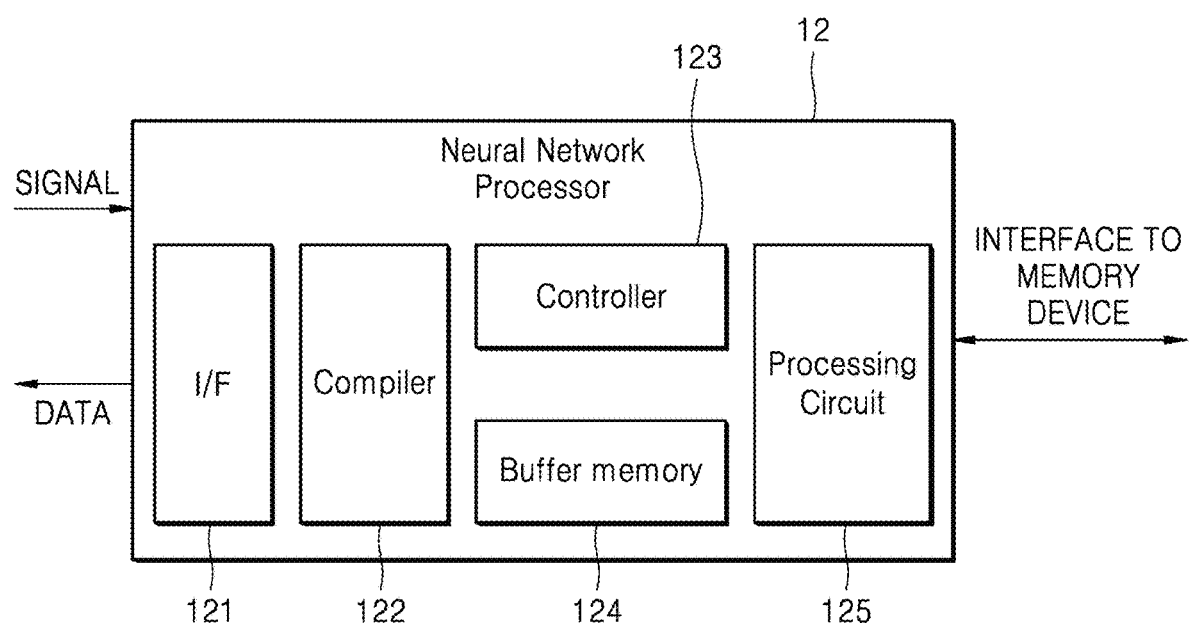
FIG. 6 is a diagram of a neural network processor according to an example embodiment.

FIG. 5 is a flowchart of a method of generating inference data by performing a neural network operation on a plurality of layers, according to an example embodiment. FIG. 6 is a diagram of a neural network processor 12 according to an example embodiment.

Referring to FIG. 6, the neural network processor 12 may include a communication interface 121, a compiler 122, a controller 123, the buffer memory 124, and the processing circuit 125. The communication interface 121 may receive the trigger signal from a controller device 11 of a storage device 10 or transmit request signals for requesting target model data and instruction data to the memory device. In addition, the communication interface 121 may receive the target model data and the instruction data from the memory device and transmit the generated inference data to an external host device or the memory device.

Referring to FIG. 5, when a neural network operation is performed on a target model including a plurality of layers, the neural network processor 12 may perform an operation on each of the layers and generate inference data. The neural network processor 12 may firstly perform a neural network operation on a first layer in response to receiving a signal.

In operation S210, the neural network processor 12 may request layer data about an n-th layer and instruction data about the layer data from a memory device. According to an example embodiment, the neural network processor 12 may request layer data about an n-th layer and instruction data about the layer data from the first memory device 13*a* or the second memory device 13*b*. Although instruction data corresponding to each piece of layer data may vary according to layer, when operations on respective layers are similar, instruction data for performing the neural network operation may be similar.

In operation S310, the memory device that has received a request signal may transmit n-th layer data and instruction data corresponding to the request signal to the neural network processor 12. According to an example embodiment, the n-th layer data may be a weight parameter stored to correspond to the n-th layer. The neural network processor 12 may generate an instruction signal for driving a processing circuit 125 of the neural network processor 12 to perform an operation on the weight parameter and input data based on the instruction data.

In operation S320, the neural network processor 12 may perform a plurality of operations on the n-th layer and generate result data. For example, the plurality of operations may include a multiplication operation, an accumulation operation, and a next layer calling operation. However, the plurality of operations are not limited thereto and may include all operations determined to generate result data for each neural network model. The result data may be data calculated after all operations determined in each layer are performed and may be input data for the next layer. The neural network processor 12 may generate result data about each layer, store the result data in a buffer memory 124, and call the next layer in response to a situation in which the result data is stored in the buffer memory 124.

In operation S330, the neural network processor 12 may determine whether the n-th layer that has generated the result data is a final layer. The final layer may refer to the output layer of FIG. 4 and may be a layer of which the next layer is absent. Based on a determination that there is a next layer of the n-th layer, the neural network processor 12 may request layer data and instruction data about an n+1-th layer and perform a neural network operation on the n+1-th layer.

In operation S340, when it is determined that the n-th layer is the final layer, the neural network processor 12 may generate the result data about the n-th layer as inference data. The neural network processor 12 may store the generated inference data in the memory device or provide the generated inference data to a host device through a communication interface 121 of the neural network processor 12.

Referring to FIG. 6, the compiler 122 of the neural network processor 12 may convert data received through the communication interface 121 into an assembly language, which may be processed by the neural network processor 12, and store the assembly language in the buffer memory 124. Referring to FIG. 6, the compiler 122 may be included in the neural network processor 12 and convert the received target model data or instruction data into the assembly language, but the inventive concept is not limited thereto. In another embodiment, the compiler 122 may be included in the memory device and receive the assembly language into which the communication interface 121 is converted.

The controller 123 of the neural network processor 12 may perform all control operations on the neural network processor 12. For example, the controller 123 of the neural network processor 12 may generate an instruction signal for driving the processing circuit 125 based on the instruction data stored in the buffer memory 124. In addition, when a plurality of operations are to be performed to generate result data, the controller 123 may instruct the next operation after each operation is performed.

The buffer memory 124 may at least temporarily store data received through the communication interface 121 and data generated by the processing circuit 125. The data received through the communication interface 121 may include, for example, the target model data and the instruction data, and the data generated by the processing circuit 125 may include the result data generated for each layer and intermediate data generated for each operation. The buffer memory 124 may at least temporarily store the result data, and provide the result data to the processing circuit 125 in response to a situation in which an operation is performed on the next layer. In addition, when the neural network processor 12 receives data for each page of the memory device, the instruction data and the target model data, which are stored together for each page, may be divided and stored in areas that are separated from each other.

The processing circuit 125 may receive at least some of the input data, the intermediate data, and the target model data from the buffer memory 124, perform operations in response to instruction signals, and generate intermediate data in each operation. The processing circuit 125 may use intermediate data generated in the previous operation to perform the next operation.

Figure 7:
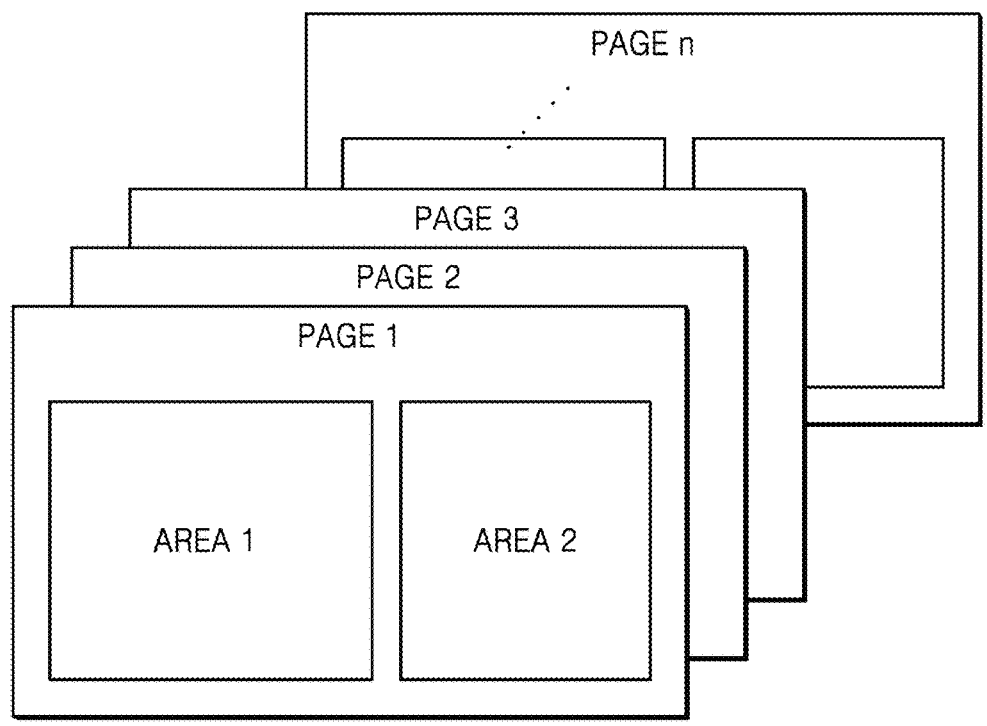
FIG. 7 is a diagram of a plurality of pages including a first page area and a second page area.

FIG. 7 is a diagram of a plurality of pages, each of which includes a first page area AREA 1 and a second page area AREA 2.

A memory device, which may be a non-volatile memory device, may include a plurality of memory cell blocks, each of which may include a plurality of pages. Referring to FIG. 7, each of the pages may include the first page area AREA 1 and the second page area AREA 2, and different types of pieces of data may be respectively stored in the first page area AREA 1 and the second page area AREA 2. For example, target model data may be stored in the first page area AREA 1, and instruction data may be stored in the second page area AREA 2. The first page area AREA 1 may be a set of memory cells configured to store 512 bits, 2 k bits, and 4 k bits, and the second page area AREA 2 may be a set of memory cells configured to store 16 bits, 64 bits, and 128 bits. However, memory sizes of the first page area AREA 1 and the second page area AREA 2 are not limited thereto, and a ratio of the first page area AREA 1 to the second page area AREA 2 may vary according to each page.

When the neural network processor (refer to 12 in FIG. 6) performs a neural network operation by receiving data about the plurality of pages, the instruction data may include address information about the next page to be read after the present page, and the neural network processor 12 may load the next page from the memory device based on the address information about the next page.

According to another example embodiment, when the neural network processor 12 loads the plurality of pages, identification bits indicating page ranges may be written in a first page and a final page of the plurality of pages. The neural network processor 12 may sequentially load pages from the memory device according to the identification bit of the first page of the plurality of pages, and end the loading of the pages according to the identification bit of the final page of the plurality of pages. The neural network processor 12 may load the plurality of pages by using the above-described method, and thus, the target model data and the instruction data for performing a neural network operation may be divided and stored in a buffer memory.

Figure 8:
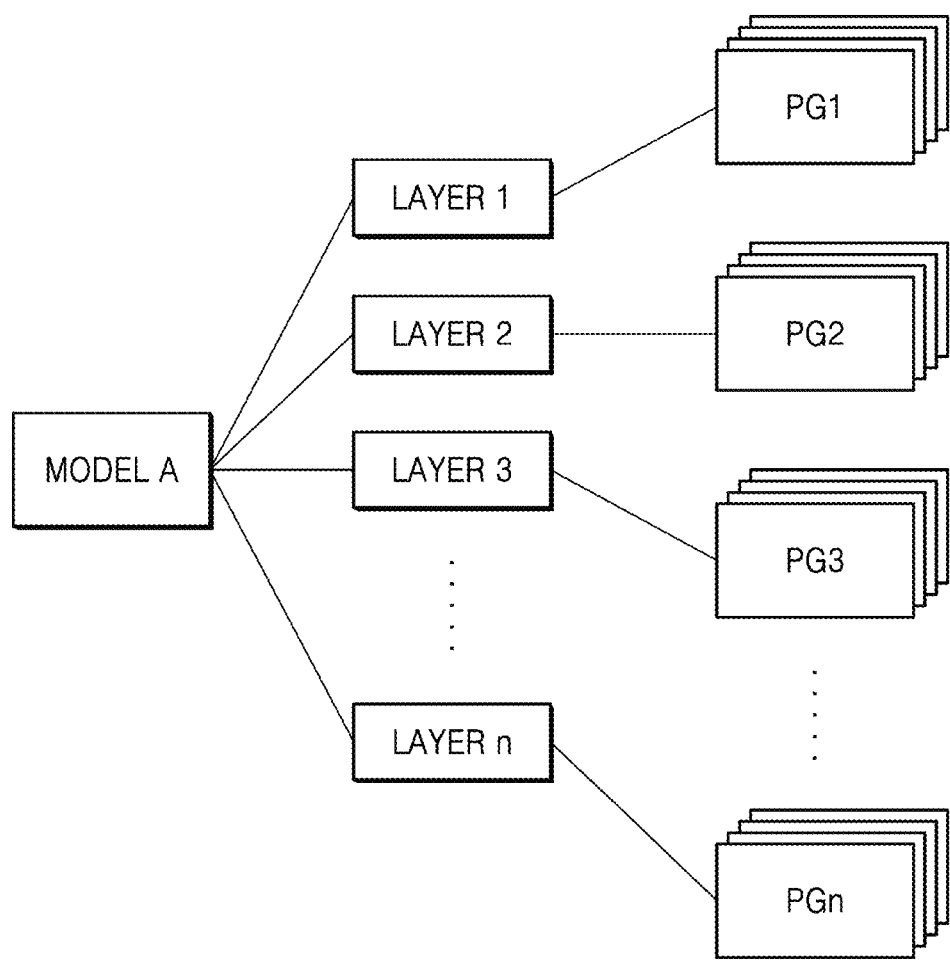
FIG. 8 is a diagram of an example in which page groups PG are respectively mapped to a plurality of layers.

FIG. 8 is a diagram of an example in which page groups PG1, PG2, PG3 and PG4 are respectively mapped to a plurality of layers. FIG. 8 will be described with reference to FIG. 1.

Referring to FIG. 8, when a neural network operation is performed on a model A, from among a plurality of neural network models, pages related to the plurality of layers may be mapped. Although FIG. 8 illustrates a case in which the pages are mapped based on the model A, the inventive concept is not limited thereto, and pages may be mapped to each of layers for each of the plurality of neural network models. Referring to FIG. 8, the model A may include n layers, and layer data corresponding to each layer and instruction data may be stored in a page group PG separated by layer. For example, a first page group PG1 may include layer data about a first layer and instruction data, and the first page group PG1 and a second page group PG2 may correspond to addresses that are separated from each other.

According to an example embodiment, the controller device 11 or the neural network processor 12 of the storage device 10 may store an address range of the page group PG, which corresponds to each layer. When the address range of the page group PG for each layer is stored in the controller device 11 of the storage device 10, the controller device 11 may transmit a trigger signal to the neural network processor 12 and simultaneously transmit address range information corresponding to each layer of a target model. When the address range of the page group PG for each layer is stored in the neural network processor 12, the neural network processor 12 may load pages of the address range corresponding to each layer. When it is determined that an operation on the corresponding layer is completed, the neural network processor 12 may load pages corresponding to the next layer.

Thus, the neural network processor 12 according to the example embodiment may receive layer data about the plurality of layers and instruction data by receiving the trigger signal only once from the controller device 11 of the storage device 10. Also, the neural network processor 12 may generate inference data without transmitting and receiving additional signals to and from the controller device 11.

Figure 9:
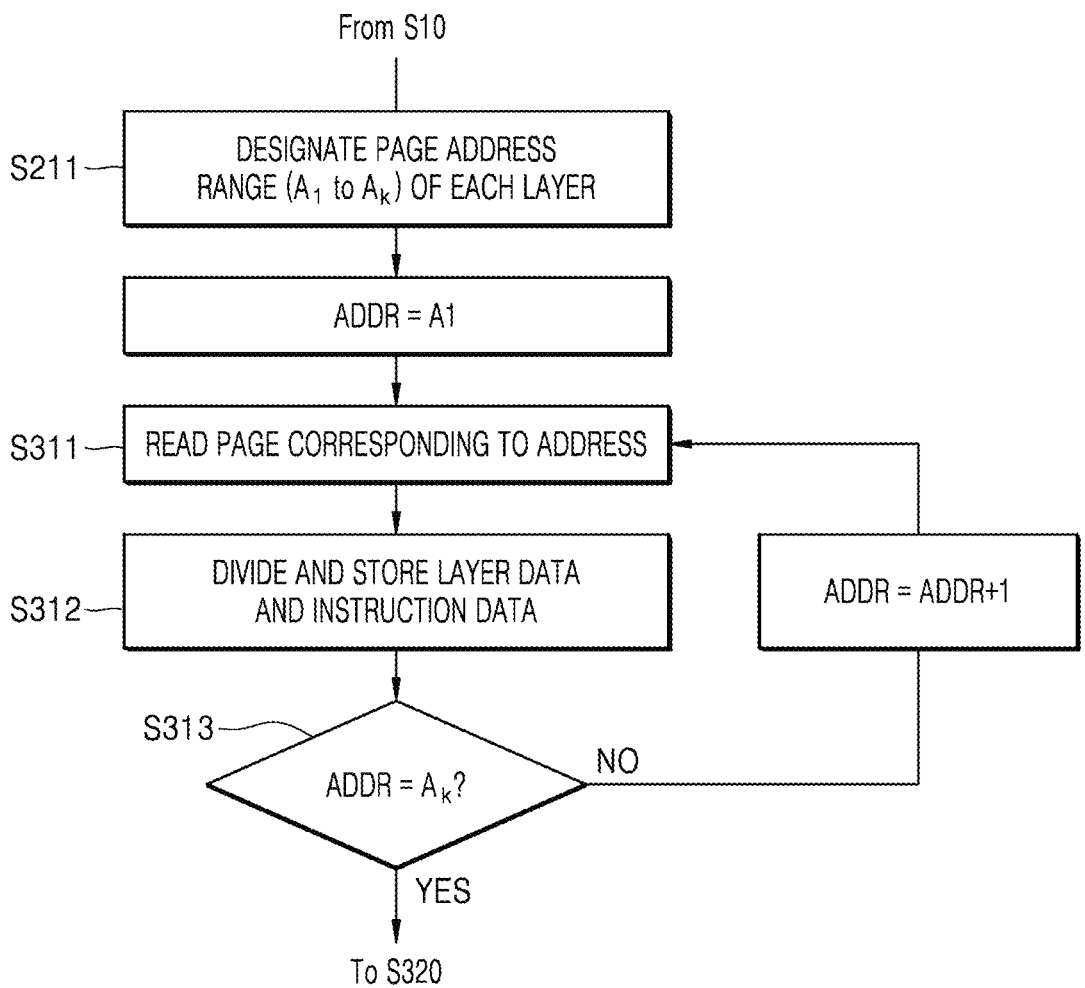
FIG. 9 is a diagram of an example in which data corresponding to each layer is received from a memory when a plurality of pages are designated for each layer.

FIG. 9 is a diagram of an example in which data corresponding to each layer is received from a memory when a plurality of pages are designated for each layer. Referring to FIGS. 1, 3 and 9, when the neural network processor 12 according to the example embodiment receives layer data and instruction data corresponding thereto from a plurality of pages, the neural network processor 12 may sequentially receive data about the plurality of pages. In operation S10 of FIG. 3, the neural network processor 12 may designate a target model in response to a situation in which the neural network processor 12 receives a trigger signal from the controller device 11 of the storage device 10, and load an address range corresponding to a plurality of layers of the target model from the controller device 11 of the storage device 10 or a buffer memory.

Referring to FIG. 9, in operation S211, the neural network processor 12 may designate a page address range of a layer on which a neural network operation is to be performed. As an example, a page group in which layer data about an n-th layer and instruction data are stored may be in an address range of $A_1$ to $A_k$, and the neural network processor 12 may request data corresponding to addresses $A_1$ to $A_k$ from a memory device.

In operation S311, the memory device may start reading data from a page corresponding to the address $A_1$ and read data about a page corresponding to a designated address.

In operation S312, the neural network processor 12 may load data about a page corresponding to an address and divide and store the layer data and the instruction data. According to an embodiment, the neural network processor 12 may divide a series of bits received based on identification bits included in each of the layer data and the instruction data into portions corresponding to the layer data and portions corresponding to the instruction data and store the divided portions in the buffer memory.

In operation S313, the neural network processor 12 may determine whether an address of a received page is a final page of the page address range of a corresponding layer. As an example, when the n-th layer is in a page address range of $A_1$ to $A_k$, the neural network processor 12 may determine whether the address of the received page is $A_k$. When the address of the received page is the final page, the neural network processor 12 may perform a neural network operation on the n-th layer; whereas, when the address of the received page is not the final page, the neural network processor 12 may load data about a page corresponding to the next address.

FIG. 10 is a flowchart of an example of determining a memory device in which layer data is to be stored, according to an arithmetic intensity of each layer. FIG. 11 is a diagram showing a table in which a storage position determined for each layer is mapped, according to an embodiment of FIG. 10. FIGS. 10 and 11 will be described with reference to FIG. 1.

The storage device 10 according to the example embodiment may store target model data and instruction data together in each page of a memory device as in the example embodiment of FIG. 7. The storage device 10 may store layer data in a first page area of a memory page of a memory cell array and store the instruction data in a second page area of the memory page of the memory cell array. The storage device 10 may load data from a page and store identification bits, which are separated from each other, together in the layer data and the instruction data to identify each of the layer data and the instruction data.

The target model data may include the layer data corresponding to each of a plurality of layers, and the storage device 10 may store a plurality of pages in which the layer data corresponding to each of the layers is stored, as one page group in the memory device. The controller device 11 or the neural network processor 12 may map each of the layers to an address of a page group for each layer and store the mapped layers and addresses.

Referring to FIG. 10, the storage device 10 according to the example embodiment may include a plurality of memory devices. The storage device 10 may determine a memory device in which the layer data about each layer and the instruction data are to be stored, from among the plurality of memory devices, based on an arithmetic intensity for performing a neural network operation. That is, assuming that the plurality of layers include a first layer and an n-th layer, which is a final layer, the storage device 10 may determine memory devices in which layer data about the first layer and the instruction data to layer data about the n-th layer and the instruction data are to be stored.

In operation S40, the storage device 10 may determine an arithmetic intensity for performing a neural network operation on the n-th layer and determine whether the arithmetic intensity exceeds a threshold value. The arithmetic intensity may correspond to the computational resource requirement for performing the neural network operation. According to an example embodiment, the arithmetic intensity may be a measure of a floating point operation performed using a code section related to the amount of memory access required to perform an operation on a corresponding layer. The arithmetic intensity may be proportional to an amount of calculations required for the corresponding layer. That is, because the arithmetic intensity is proportional to the amount of calculations for a size of a model, as the size of the model increases and the amount of calculations is reduced, the arithmetic intensity may be reduced.

When the storage device 10 determines that the arithmetic intensity corresponding to the n-th layer is less than the threshold value, the process may proceed to operation S50. Otherwise, when the storage device 10 determines that the arithmetic intensity is greater than or equal to the threshold value, the process may proceed to operation S60.

In operation S50, because the arithmetic intensity corresponding to the n-th layer is less than the threshold value, the neural network processor 12 may determine that the n-th layer has a small amount of calculations for size and store n-th layer data in the first memory device 13a. In contrast, in operation S60, because the arithmetic intensity corresponding to the n-th layer is greater than or equal to the threshold value, the neural network processor 12 may determine that the n-th layer has a large amount of calculations for size and store the n-th layer data in the second memory device 13b.

The first memory device 13a of the storage device 10 according to the example embodiment may be a memory device capable of transmitting a large amount of information per second, while the second memory device 13b thereof may be a memory device capable of transmitting a smaller amount of information per second compared to the first memory device 13a. For example, the first memory device 13a may be an HBN memory capable of transceiving data at 10 Gbps, and the second memory device 13b may be a NAND memory capable of transceiving data at 4 Gbps. That is, the first memory device 13a may be an HBN memory capable of transmitting and receiving data at 10 Gbps, and the second memory device 13b may be a NAND memory capable of transmitting and receiving data at 4 Gbps.

The storage device 10 according to the example embodiment may be the storage device mounted in a mobile device. Thus, it may be necessary to efficiently utilize a memory device to perform a neural network operation in the mobile device. Accordingly, in the example embodiment, only pieces of layer data determined to have a great data size compared to an amount of calculations may be stored in an HBN memory, while the remaining pieces of layer data may be stored in a typical NAND memory. Thus, the HBN memory, which is limitedly mounted in the mobile device, may be efficiently utilized.

In operation S70, the storage device 10 in which the n-th layer data is stored in the first memory device 13a or the second memory device 13b may determine whether the n-th layer is a final layer. When it is determined that the n-th layer is the final layer, the storage device 10 may end the storing of data because the storing of the target model data has been completed. Otherwise, when it is determined that the n-th layer is not the final layer and there is more layer data to be stored, the storage device 10 may proceed to an operation of storing layer data about the next layer and instruction data.

Referring to FIG. 11, the storage device 10 may map and store a storage position of each layer. According to an example embodiment of FIG. 11, layer data about each of the first layer, a second layer, and a fourth layer and the instruction data may be stored in the first memory device 13a, layer data about each of a third layer and the n-th layer and the instruction data may be stored in the second memory device 13b. The storage device 10 may store mapping information about the storage position of each layer of FIG. 1.

When the neural network processor 12 performs a neural network operation by loading the target model data, the layer data about each layer may be loaded based on the mapping information about the storage position of the layer corresponding thereto. As an example, the layer data about the first layer and the instruction data may be loaded from the first memory device 13a, and the layer data about the third layer and the instruction data may be loaded from the second memory device 13b.

According to the example embodiment of FIGS. 10 and 11, the layer data about each layer may be stored in any one of two memory devices (e.g., the first memory device 13a and the second memory device 13b), but the number of memory devices is not limited thereto. In other embodiments, the layer data about each layer may be stored in any one of at least three memory devices.

Figure 12:
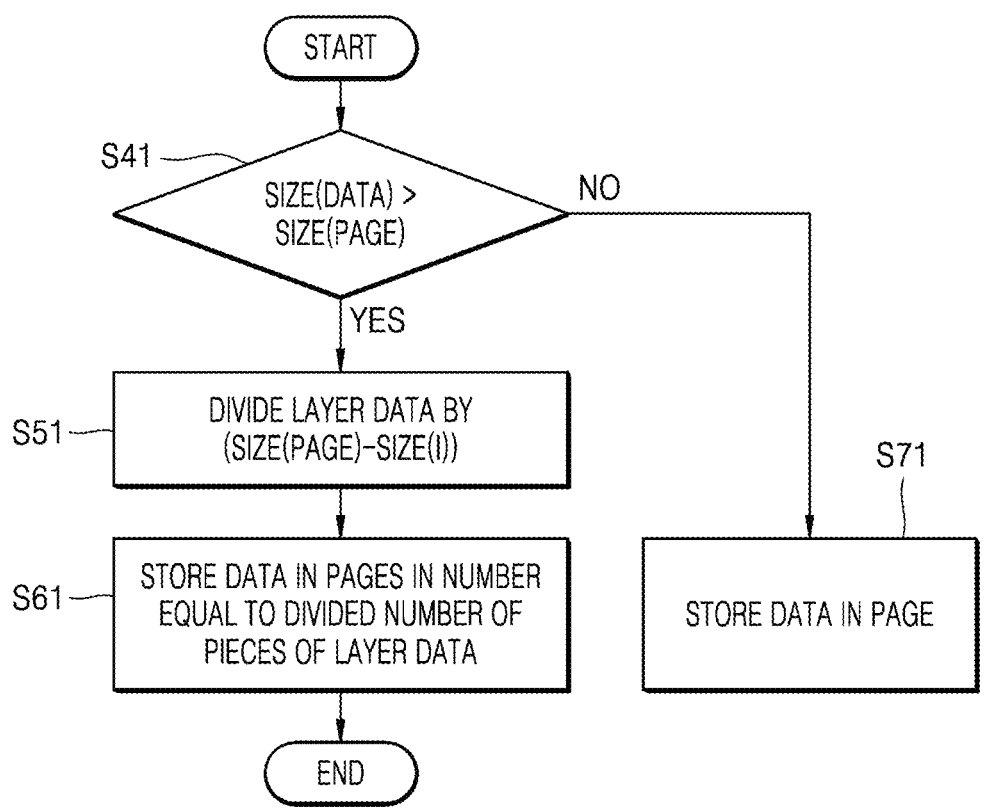
FIG. 12 is a flowchart of an example of determining whether to divide data according to a size of data to be stored in a memory device and store the data.

FIG. 12 is a flowchart of an example of determining whether to divide data according to a size of data to be stored in a memory device and store the data. FIG. 12 will be described with reference to FIG. 1.

Referring to FIG. 12, the storage device 10 according to the example embodiment may determine whether to divide data to be stored and store the divided data in a plurality of pages. As an example, when layer data includes a series of bits, it may be determined whether to divide the layer data depending on whether the number of bits of the layer data and instruction data is greater than the number of bits that the memory device may store in one page. The neural network processor 12 may load all the layer data by loading the layer data, which is divided into the plurality of pages, in page order.

In operation S41, the storage device 10 may determine whether a total data size of the sum of the instruction data and the layer data is greater than a page size. When the total data size is greater than the page size, the entire data may not be stored in one page. Thus, the storage device 10 may determine that the division of data is required, and proceed to operation S51. In contrast, when it is determined that the entire data is smaller than page data (i.e., when the total data size is less than the page size), the storage device 10 may determine that the division of data is not required, and proceed to operation S71.

In operation S51, the storage device 10 may divide the layer data by a size obtained by subtracting a size of the instruction data from the page size. As an example, when the page size is 4 kb and the size of the instruction data is 1 kb, the storage device 10 may divide the layer data in units of 3 kb. When a size of the layer data is 24 kb, the layer data may be divided in the units of 3 kb into a total of 8 pages.

In operation S61, the storage device 10 may store the divided layer data and the instruction data together in one page. As an example, data divided into the 8 pages in operation S51 may be each stored together with the instruction data. In operation S71, when the total data size is less than the page size, the storage device 10 may store the layer data and the instruction data together in one page.

While the inventive concept has been particularly shown and described with reference to example embodiments thereof, it will be understood that various changes in form and details may be made therein without departing from the spirit and scope of the following claims.

What is claimed is:

1. A method of operating a storage device comprising a neural network processor, the method comprising:
    outputting, by a controller device, a signal instructing the neural network processor to perform a neural network operation based on a command from a host device;
    requesting, by the neural network processor, target model data and instruction data from a memory device storing the target model data and the instruction data based on the signal, the target model data corresponding to parameters of a target model and the instruction data for performing the neural network operation based on the target model;
    receiving, by the neural network processor, the target model data and the instruction data from the memory device; and
    outputting, by the neural network processor, inference data based on the target model data and the instruction data.

2. The method of claim 1, wherein the requesting the target model data and the instruction data comprises:
    designating a page address of the memory device, and requesting the target model data and the instruction data that are written together in the page address.

3. The method of claim 2, wherein the requesting the target model data and the instruction data, comprises:
    requesting the target model data and the instruction data from a next page address when the instruction data written in the designated page address includes information corresponding to the next page address.

4. Method of claim 1, wherein the outputting the inference data comprises outputting result data corresponding to each layer of the target model by performing a series of operations on input data based on the instruction data.

5. The method of claim 4, wherein the requesting the target model data and the instruction data comprises requesting first layer data corresponding to a first layer of the target model and the instruction data from the memory device based on the signal.

6. The method of claim 5, wherein the outputting the inference data comprises:
    receiving the first layer data and the instruction data from the memory device, and generating first result data by performing the neural network operation on the first layer; and
    requesting, by the neural network processor, second layer data from the memory device based on the first result data.

7. The method of claim 6, wherein the outputting the inference data comprises:
    generating a second result data by performing the neural network operation on a second layer by using the first result data as input data; and
    generating the second result data as the inference data based on a determination that the second layer is a final layer of the target model.

8. The method of claim 1, wherein the outputting the inference data comprises dividing the target model data and the instruction data, and respectively storing the target model data and the instruction data in separate buffer memories.

9. The method of claim 1, further comprising storing the target model data and the instruction data together in each page of the memory device.

10. The method of claim 9, wherein the storing of the target model data and the instruction data comprises storing layer data corresponding to each layer of the target model and the instruction data in each page group.

11. The method of claim 9, wherein the storing of the target model data and the instruction data comprises identifying a memory in which layer data corresponding to each layer of the target model and the instruction data are to be stored, based on an arithmetic intensity for performing the neural network operation on the each layer of the target model.

12. The method of claim 11, wherein the identifying the memory in which the layer data and the instruction data are to be stored comprises:
    storing first layer data in a first memory based on a first arithmetic intensity of a first layer being less than a threshold value, and
    storing the first layer data in a second memory based on the first arithmetic intensity of the first layer being greater than or equal to the threshold value.

13. The method of claim 9, wherein, based on the instruction data including page sequence information corresponding to a plurality of pages, the storing of the target model data and the instruction data comprises writing identification bits indicating page ranges in which the target model data is written, in a first page and a final page of the plurality of pages.

14. The method of claim 9, wherein the storing the target model data and the instruction data comprises storing an address of a page related to the target model data in the controller device or the neural network processor.

15. A storage device comprising:
    a controller device configured to output a first signal instructing a neural network operation based on a command from a host device;
    a memory device configured to store target model data corresponding to a parameter of a target model in a first page area of a page in the memory device and store instruction data for instructing the neural network operation in a second page area of the page in the memory device; and
    a neural network processor configured to:
    output a second signal to the memory device based on the first signal, the second signal including a request for the target model data and the instruction data from the memory device,
    receive the target model data and the instruction data from the memory device, and
    output inference data based on the target model data and the instruction data.

16. The storage device of claim 15, wherein the memory device is further configured to:
    designate a page address, and
    provide target model data and instruction data, which correspond to the designated page address, to the neural network processor.

17. The storage device of claim 15, wherein the neural network processor is further configured to:
    perform a series of operations on input data based on first layer data corresponding to a first layer of the target model and the instruction data,
    generate result data corresponding to the first layer of the target model, and
    request second layer data from the memory device in response to the generating of the result data.

18. A memory device comprising:
    a memory cell array comprising a plurality of pages; and
    a memory controller device configured to:
    perform a read operation on a target page, among the plurality of pages, based on a read command for the target page, and
    output the target page,
    wherein each of the plurality of pages comprises:
    a first page area configured to store target model data corresponding to a target model on which a neural network operation is to be performed; and
    a second page area configured to store instruction data for instructing the neural network operation on the target model.

19. The memory device of claim 18, wherein the memory cell array comprises a plurality of page groups configured to store layer data corresponding to each layer of the target model and the instruction data.

20. The memory device of claim 19, wherein the plurality of page groups store layer data corresponding to layers of which an arithmetic intensity for performing the neural network operation is less than a threshold value and the instruction data.

* * * * *